United States Patent [19]

Downs

[11] 3,997,634
[45] Dec. 14, 1976

[54] DIFFUSER ASSEMBLY
[76] Inventor: Ernest W. Downs, P.O. Box 30038, Cincinnati, Ohio 45230
[22] Filed: Jan. 27, 1975
[21] Appl. No.: 544,222

Related U.S. Application Data

[63] Continuation of Ser. No. 404,722, Oct. 9, 1973, abandoned, which is a continuation-in-part of Ser. No. 160,721, July 8, 1971, abandoned.
[52] U.S. Cl. .......................... 261/122; 239/533.14; 239/567; 261/124
[51] Int. Cl.² .......................................... B01F 3/04
[58] Field of Search .............. 261/121 R, 122–124; 239/534, 535, 543, 562, 567; 137/525.1, 525; 215/41, 56; 210/219–221

[56] References Cited
UNITED STATES PATENTS

| | | | |
|---|---|---|---|
| 2,554,790 | 5/1951 | Miller | 239/534 X |
| 2,603,465 | 7/1952 | Malzacher | 261/142 |
| 2,713,953 | 7/1955 | Jewell | 137/525 X |
| 2,878,836 | 3/1959 | Binks | 239/534 X |
| 3,242,072 | 3/1966 | Walker | 261/124 X |
| 3,272,403 | 9/1966 | Alexander | 239/534 X |
| 3,276,698 | 10/1966 | Wood | 239/535 X |
| 3,294,380 | 12/1966 | Born | 261/121 R |
| 3,334,819 | 8/1967 | Olavson | 239/534 |
| 3,586,196 | 6/1971 | Barton et al. | 215/250 X |
| 3,618,802 | 11/1971 | Yates, Jr. | 215/41 |

FOREIGN PATENTS OR APPLICATIONS

| | | | |
|---|---|---|---|
| 134,927 | 10/1949 | Australia | 261/122 |
| 597,951 | 5/1960 | Canada | 261/124 |

Primary Examiner—Tim R. Miles
Assistant Examiner—Richard L. Chiesa
Attorney, Agent, or Firm—William B. Noll

[57] ABSTRACT

This invention relates to a diffuser adapted to aerate a fluid medium, such as sewage in which it may be immersed. The diffuser consists essentially of two elements, namely, a T shaped member, the leg of which is provided with a central bore and adapted to be connected to a source of a fluid medium, such as air, under pressure, while the top is preferably flat and disc shaped. Overlying said top, is a cap or cover which is flexible and adapted to lie contiguous with the surface of said top. Said cap is provided with an annular rim which engages said top along and under the peripheral edge thereof. Finally, means cooperating between said T shaped member and said flexible cover are provided to permit the intermittent release of the fluid medium, such as gas, from said diffuser; however, the flexible nature of said cap in combination with said means is such that the back pressure of fluid medium to be aerated will prevent the flow of such fluid medium through the said diffuser.

11 Claims, 10 Drawing Figures

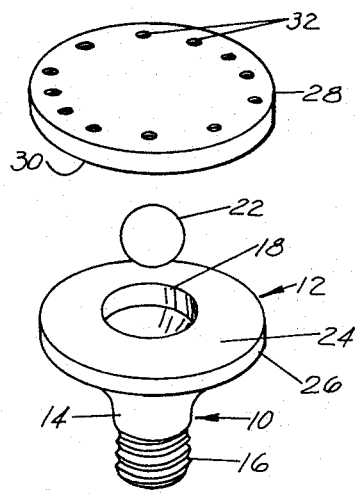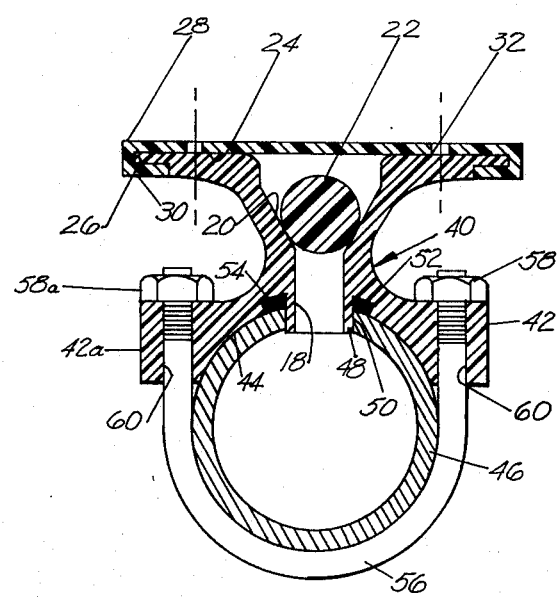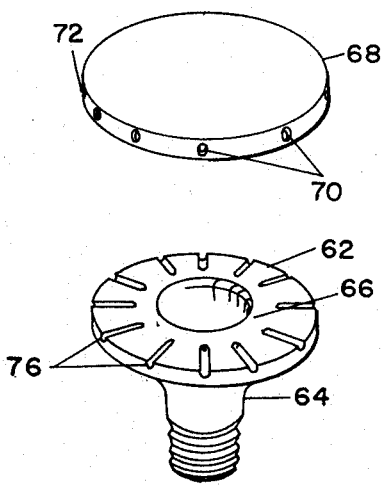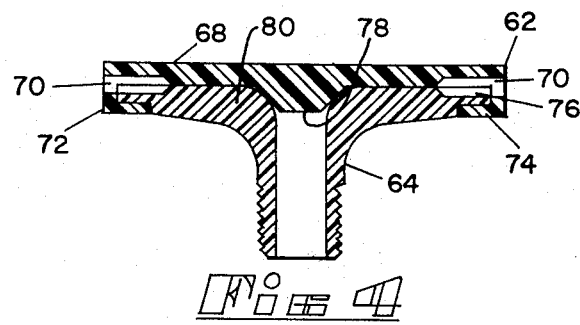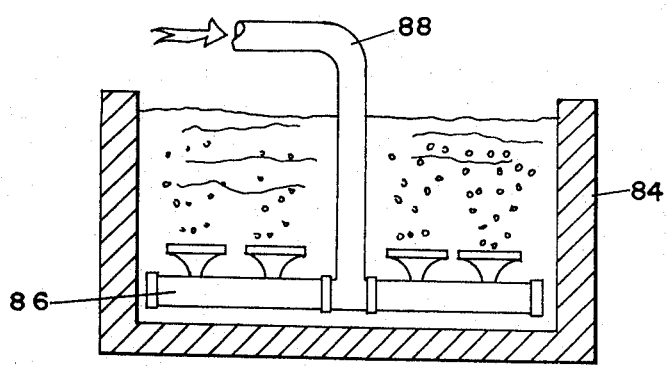

DIFFUSER ASSEMBLY

RELATED APPLICATIONS

This application is a continuation of Ser. No. 404,722, now abandoned, filed Oct. 9, 1973, entitled "Improved Diffuser Assembly" which in turn was a continuation-in-part of application Ser. No. 160,721, filed July 8, 1971, and entitled "Diffuser Assembly," now abandoned.

BACKGROUND OF THE INVENTION

This invention is directed to an improved diffuser assembly for use primarily in aerating sewage, but may have application for any aeration process including the aeration of other fluid mediums such as found in the chemical industries.

The diffuser assembly is particularly advantageous in connection with the aeration of sewage in industrial waste plants in which the sewage may contain materials likely to cause porous diffusers to clog too rapidly for satisfactory use. Typically, diffusers of the type used in sewage aeration function as a valve in that gas is admitted into the sewage, while the back pressure of the sewage tends to act against the passage of the gas thereby intermittently closing the valve. In other words, the assembly operates at irregular intervals between the open and closed positions.

Occasionally particles become lodged in the diffuser or erosion occurs therein making it necessary, often frequently, to change the said assembly. The present invention eliminates much of the down time by providing a diffuser which can be easily cleaned or repaired, and returned to the treatment area quickly.

SUMMARY OF THE INVENTION

In the practice of this invention, provision is made for a two element diffuser which is particularly adapted for use in aerating sewage waste. Said diffuser comprises a base of T shaped member, formed of "delrin", or similar material, having a central bore therethrough. It is through said bore that the aerating fluid, such as gas, passes for treatment of the surrounding fluid medium.

Overlying and contiguous with an annular portion of the top of said T shaped member is a flexible cap or cover, i.e., neoprene or the like, which engages or wraps around the peripheral edge thereof. Means, such as a plurality of through holes, are provided in said annular portion to permit the release of gas from said diffuser into the treatment medium.

When a repair or cleaning of the diffuser becomes necessary, the cap is merely removed and a new one, if needed, is snapped in place.

BRIEF DESCRIPTION OF THE DRAWINGS

FIG. 1 is an exploded view in perspective of one embodiment of a diffuser constructed according to the teachings of this invention.

FIG. 2 is a sectional view of a modified assembled diffuser bracketed to an aerating gas conduit.

FIG. 3 is an exploded view in perspective of a second embodiment of a diffuser constructed according to the teachings of this invention.

FIG. 4 is a sectional view taken through the assembled diffuser of FIG. 3.

FIG. 5 is a side sectional view of a liquid medium filled tank, such as a sewage treatment tank, embodying one of the diffuser assemblies of the present invention.

DETAILED DESCRIPTION OF THE PREFERRED EMBODIMENTS

Figure 6:
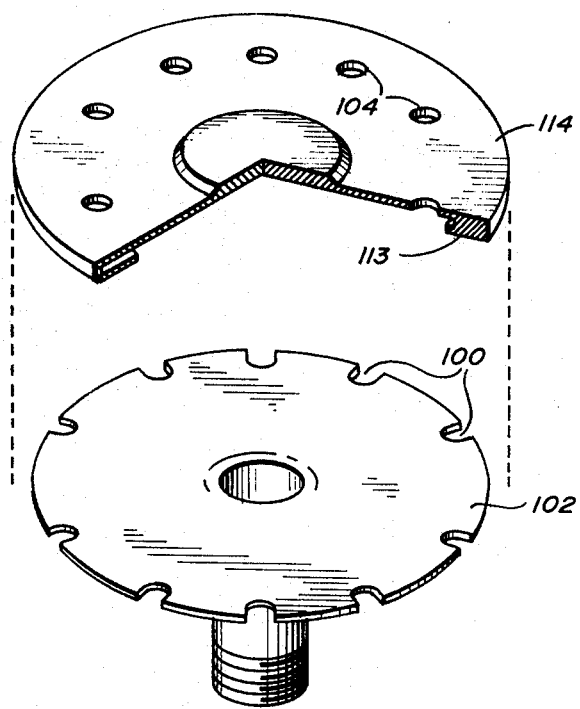
FIG. 6 is an exploded view similar to FIG. 1 and 3, except that a portion of the cover is broken away to reveal details of the cover locking mechanism, showing a third embodiment of a diffuser constructed according to the teachings of this invention.

Turning first to a discussion of the embodiments in FIG. 1, it will be seen that the diffuser assembly of this invention comprises essentially two primary elements. The first of said elements is the funnel shaped base 10, made of a plastic, such as delrin or the like, and having an annular top 12 and flared base portion 14, the latter being threaded 16 for engagement with a gas line (not shown). A central bore 18 is provided therethrough and may be contoured in a manner similar to the outside surface. By such a construction, a seat 20 is provided for engagement by floating ball 22. This significance of the latter will be appreciated in the discussion to follow.

The upper surface of top 12 is characterized by a continuous annular portion 24, and by a peripheral edge 26 thereabout adapted to be engaged by the flexible cap 28.

The cap 28 is formed of flexible material, such as neoprene and the like. The cap is characterized by an underturned annular flange 30 which is adapted to engage the peripheral edge 26, thereby holding said cap 28 contiguous with the annular portion 24 of top 12. This, as will be noted later, represents the "closed" position for the assembly.

Spaced around the cap 28 and directly overlying the annular portion 24 are a plurality of holes 32, which, when the cap is flexed clearing it from said annular portion, will permit the flow of aerating gas out of the assembly. This then is the "open" position. One advantage in locating the holes 32 in the flexible cap or cover 28 is that any contaminants which may become lodged in said holes would tend to break loose during the flexing action of cap 28 and holes 32. While such an arrangement of the holes in the flexible cover 28 is preferred, it will be understood that holes may be provided in the annular portion 24. The flexing action of the cover would still act to intermittently open and close such holes.

The diffuser assembly shown in FIG. 2 is a modification of the assembly in FIG. 1, but only to the extent of the base portion 40. Accordingly, the same reference numerals will be used where applicable to identify like items or components.

Specifically, said base portion 40 is characterized by oppositely projecting flange portions 42, 42a, which are mutually curved 44 to seat on the gas conduit 46. Through the center of the said diffuser assembly is central bore 18 adapted to transmit the fluid medium, such as air or other gas, from conduit 46 through the said assembly. Extension means 48 are provided to be inserted into the conduit opening 50 to assist in locating or centering the diffuser assembly. About said extension 48, an annular groove 52 is provided to receive a rubber type washer 54 and thereby assure a gas tight seal.

The base portion 40 is securely held to the conduit 46 by means such as a U bolt 56, and nuts 58, 58a, encircling the said conduit and engaging each said flange portion 42, 42a through fastener receiving holes 60.

The embodiment illustrated in FIGS. 3 and 4 represents a modification of the previous ones, particularly in the top surface 62 of the flared base portion 64. However, said top surface is similar in that provision is made for a continuous annular portion 66 against which the cap 68 will lie during the closed portion of the aerating cycle.

The one apparent distinction over the embodiment in FIGS. 1 and 2 is the manner in which the holes 70 are found in caps 68. Radially aligned holes 70 are provided in and around the peripheral edge 72, intermediate the top surface 62 and underturned annular flange 74. The hole shape has the advantage of shaping and controlling bubble size which effects diffuser efficiency.

To assist the release of gas, complimentary slots 76, radially spaced with one for each hole 70, may be provided on the top surface 62.

As an alternative to a diffuser cover having a substantially uniform thickness throughout its major dimension or that portion to be contacted by the annular flanged portions of the base, the cover 68 may be provided with a raised center portion 78. The angled surface 80 acts as a secondary seal when lying against or seated within the upper end of bore 82. The thicker center portion 78 provides a heavier section to resist the reverse pressure created by the fluid media which tends to deform the cap into the bore 80 or unsupported base area. As an alternative to this, the raised center portion may project above the cover (see FIGS. 7, 9 and 10). One significant advantage is that softer, better sealing cap material may be used since the cap doesn't have to resist deformation.

What has been shown as one embodiment of a cover locking mechanism in FIGS. 2 and 4 is amplified and modified in FIGS. 6 to 10. One of the problems of the prior art devices is a tendency on the part of a cover to slip off, unless securely fastened by some locking mechanism. However, the addition of such complicates the maintenance thereof. By the system herein a simple and expedient means is provided for securing the cover to the base.

Figure 8:
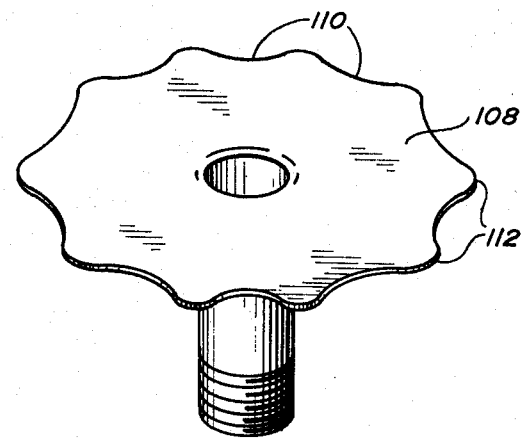
FIG. 8 is a perspective view illustrating a modification to the diffuser base.

It will be recalled that the cover, which is flexible in nature, will raise up under the pressure of the aerating fluid medium or gas. As a consequence there is a tendency for the inturned annular rim of the cover to become disengaged from the flanged portion of the base. FIGS. 6 and 8 show different treatments to cover peripheral edge of the flanged portion of the base. The former achieves this result by the inclusion of shallow radial slots 100. The radial dimension of said slots 100 should not be so great as to interfere with the continuous annular face portion 102 against which the holes 104 of the cover 106 lie. FIG. 8 shows a different design for the cover support face 108. The said face is characterized by a scaloped or waveform peripheral edge with a plurality of radially reduced portions 110 alternating with peak or normal portions 112.

The improved covers to be used in conjunction with the bases shown in FIGS. 6 and 8 characterized by the inclusion of a plurality of inwardly projecting web sections 113 (FIG. 6, top) joining the top of the cover with the inturned annular rim. Said web sections 113 are uniformly positioned about the cover such as to seat within the notches 100, or reduced portions 110, when the cover is mounted on the base.

With such a cover, containing the webs configured to the design of the notches or recessed portion of the base, an advantage is gained in holding the cover thereon. When the cover is bowed by upward pressure of the aeration fluid medium or gas, the web section is pulled upward. Since the web section is attached to the annular rim, the said rim is also pulled upward tight against the lower side of the flared cover support portion, or groove as discussed later. This prevents the rim from flaring out and slipping around the peripheral edge.

Figure 7:
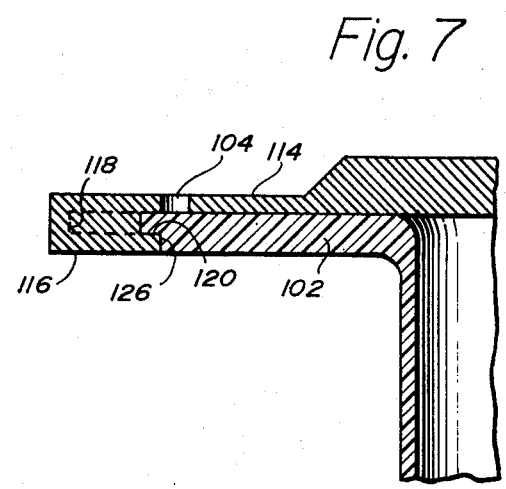
FIG. 7 is an enlarged partial sectional view taken through the assembled diffuser of FIG. 6, and showing one version of the means for locking the diffuser cover to the base.
Figure 9:
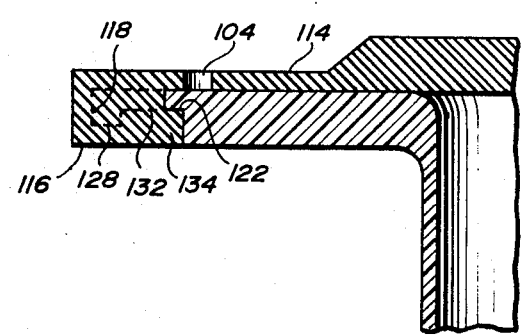
FIG. 9 is an enlarged partial sectional view similar to FIG. 7, but showing a variation to the cover locking means.
Figure 10:
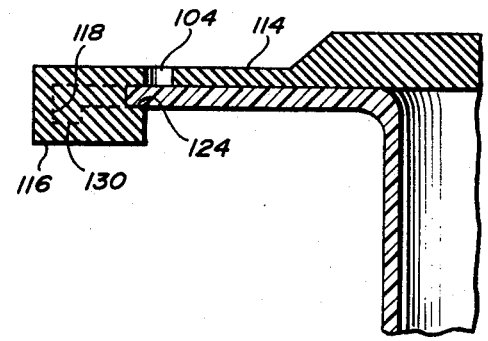
FIG. 10 is an enlarged partial sectional view similar to FIGS. 7 and 9, but illustrating variations thereto.

To supplement the locking of the cover to the base, the cover 114, illustrated in partial section in FIGS. 7, 9 and 10, is provided with an inturned annular rim 116 which engages the peripheral edge 118 and seats in a suitable groove 120, 122, 124. FIG. 7 shows one embodiment of a groove where said rim seats therein against shoulder 126. FIGS. 9 and 10 reveal more secure locking mechanisms. In each of the latter embodiments, the annular rim 116 actually wraps around a downwardly projecting peripheral shoulder 128, 130 provided on the underside of the flanged portion of the base. Finally, the feature of the downwardly projecting shoulder 128 may be coupled with an adjacent U-shaped groove 132 into which the endmost portion 134 of the rim 116 of the cover is fully contained.

Considering now an exemplary operation of the said diffuser assemblies, there is shown in FIG. 5 a liquid media tank 84 in which is mounted an aeration system comprising a gas entry conduit 86 formed with a cross member 88 serving as a manifold and having a plurality of diffuser assemblies, such as shown in the several FIGURES.

When the diffuser assembly as above is immersed in sewage or other liquid media to be aerated, air or gas under pressure flows through conduit 86 into cross member 88 and through the central bore of the diffuser assembly. The air exerts pressure against the flexible cap 28, 68 lifting it away from the underlying surface of the top 12, 62, respectively. This permits the release of air through the plurality of holes 32 into the liquid media.

When air pressure is not present in the aeration system, the pressure of the liquid media acts to hold the cap 28, 68 against the annular portions 24, 66, respectively, thereby forming a tight seal preventing backflow of liquid media into the aeration system.

Occasionally solid particles may become lodged between the cap and annular portion, preventing a complete seal. When this occurs, liquid media could leak into the diffuser and conduit. Provision has therefore been made herein to include a second means to provide an air pocket to prevent back flow of the liquid media. Such means is demonstrated in FIGS. 1 and 2. Here, resilient floating ball 22, when positioned in seat 20, traps a pocket of air between the flexible cap and the ball seal. This trapped air pocket in turn reduces the possibility of any liquid media leakage into said diffuser. It will be appreciated that said means may also be employed with the designs illustrated in the remaining FIGURES.

It will be observed from the above that the diffuser bore or central chamber is designed to permit resilient ball 22 to ride free within the restricted portion of said chamber. However, this can be modified through a design change to locate the ball, when seated, to a position just below the overlying cap or cover. By so constructing the diffuser, the seated ball will support the cap or cover in its central area which is being acted upon by the reverse pressure of the liquid media. This design would also allow for the use of softer, better sealing material for the cap or cover.

Since modifications may become apparent to those skilled in the art, particularly after reading these specifications, no limitation is intended to be imposed herein except as set forth in the appended claims.

I claim:

1. A diffuser assembly adapted to aerate a liquid medium within which it is immersed, comprising a first member having means at one end thereof for connecting to a source of aerating gas under pressure, and at the opposite end a face having a peripheral edge thereabout, said face being provided with a plurality of radially projecting slots, said first member having a gas pressure chamber communicating with said gas source, and a flexible cover engaging said peripheral edge and lying contiguous with said face, said cover being provided with a plurality of holes along the peripheral engaging portion of said cover such that each hole is aligned with one of the said slots.

2. The diffuser assembly claimed in claim 1, wherein the cross-section of said gas pressure chamber is greater near said face than at said one end, and including a ball adapted to float within said larger sectioned portion under the action of said gas pressure, and to seat therein when said gas pressure ceases.

3. A diffuser assembly composed of two members and adapted to aerate a first fluid medium within which said diffuser assembly is contained while exerting pressure on said diffuser assembly, where:
   1. the first of said members comprises a fluid chamber having means at one end thereof for connecting to a source of a second fluid medium under pressure, and at the opposite end a cover support having a flanged portion adapted to engage a cover,
      a. said flanged portion having a continuous annular portion and a peripheral edge which is provided with a plurality of radially projecting major segments separated from adjacent major segments by minor segments having a lesser radial dimension, and
   2. the second of said members, engaging the flanged portion of said first member, comprises a flexible cover of uniform thickness throughout at least that portion thereof in contact with said continuous annular portion, an inturned rim which engages said peripheral edge, and a plurality of inwardly projecting webs joining said cover and said inturned annular rim,
      a. said webs being positioned within said second member such that during engagement of said first and second members each said web is radially aligned with one of said minor segments and lies between adjacent major segments, and that said diffuser assembly includes means cooperating between said first and second members to permit the release of the second fluid medium from said fluid chamber when the pressure thereof is greater than the pressure exerted by said first fluid medium against said second member.

4. The diffuser assembly claimed in claim 3, wherein said means cooperating between said cover and said first member comprise a plurality of holes in said flexible cover.

5. The diffuser assembly claimed in claim 3, wherein the underside of said flanged portion is provided with a shoulder recessed from said peripheral edge and that said inturned annular rim of the cover is caused to abut said shoulder.

6. The diffuser assembly claimed in claim 3, wherein the underside of said flanged portion is provided with an annular groove and that said inturned annular rim of the cover is seated in said groove.

7. A diffuser assembly composed of two members and adapted to aerate a first fluid medium within which said diffuser assembly is contained while exerting pressure on said diffuser assembly, where:
   1. the first of said members comprise a fluid chamber having means at one end thereof for connecting to a source of a second fluid medium under pressure, and at the opposite end a cover support having a flanged portion adapted to engage a cover,
      a. said flanged portion having a continuous annular portion and a peripheral edge which is uniformly scalloped such that the said flanged portion is characterized by different radial dimensions varying between a full and a lesser radial dimension, and
   2. the second of said members, engaging the flanged portion of said first member, comprises a flexible cover of uniform thickness throughout at least that portion thereof in contact with said continuous annular portion, an inturned rim which engages said peripheral edge, and that said diffuser assembly includes means cooperating between said first and second members to permit the release of the second fluid medium from said fluid chamber when the pressure thereof is greater than the pressure exerted by said first fluid medium against said second member.

8. The diffuser assembly claimed in claim 7, wherein inwardly projecting webs join the said cover and said inturned annular rim at each location of said lesser radial dimension.

9. The diffuser assembly claimed in claim 3, wherein said means cooperating between said cover and said first member comprise a plurality of holes in said flexible cover.

10. The diffuser assembly claimed in claim 7, wherein the underside of said flanged portion is provided with a shoulder recessed from said peripheral edge and that said inturned annular rim of the cover is caused to abut said shoulder.

11. The diffuser assembly claimed in claim 7, wherein the underside of said flange portion is provided with an annular groove and that said inturned annular rim of the cover is seated in said groove.

* * * * *